Jan. 12, 1960 T. J. KOLODZIEJSKI 2,920,420
TOY AUTOMOBILE AND TRACK
Filed Aug. 28, 1957 3 Sheets-Sheet 2
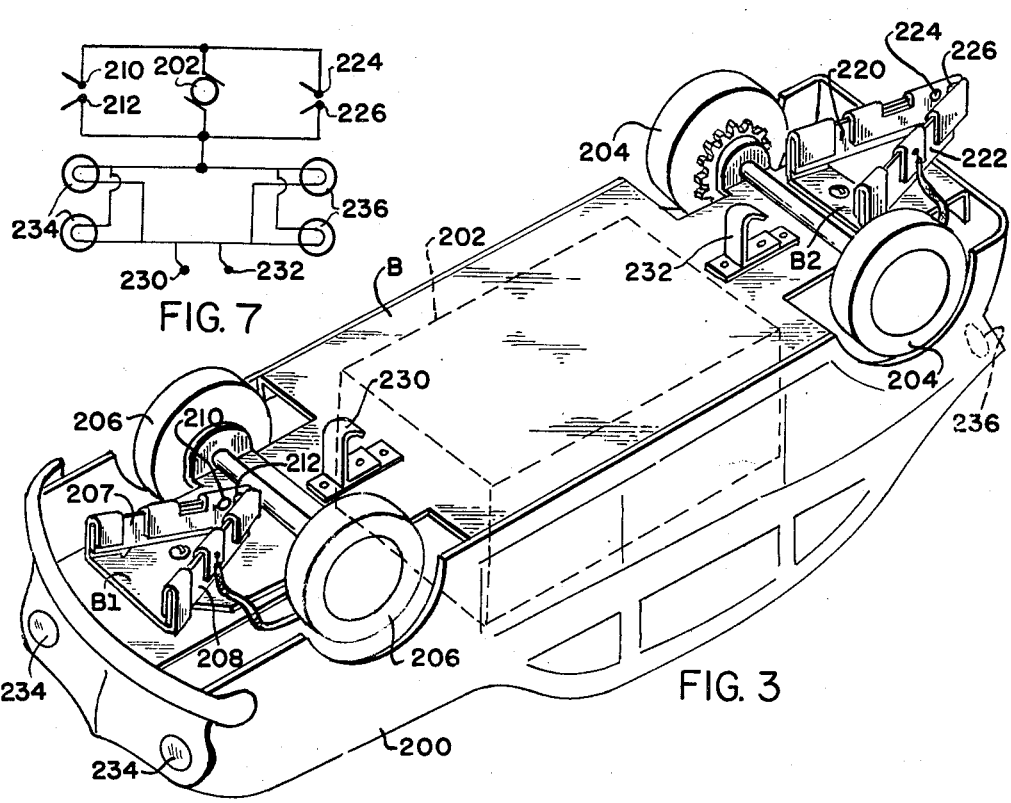
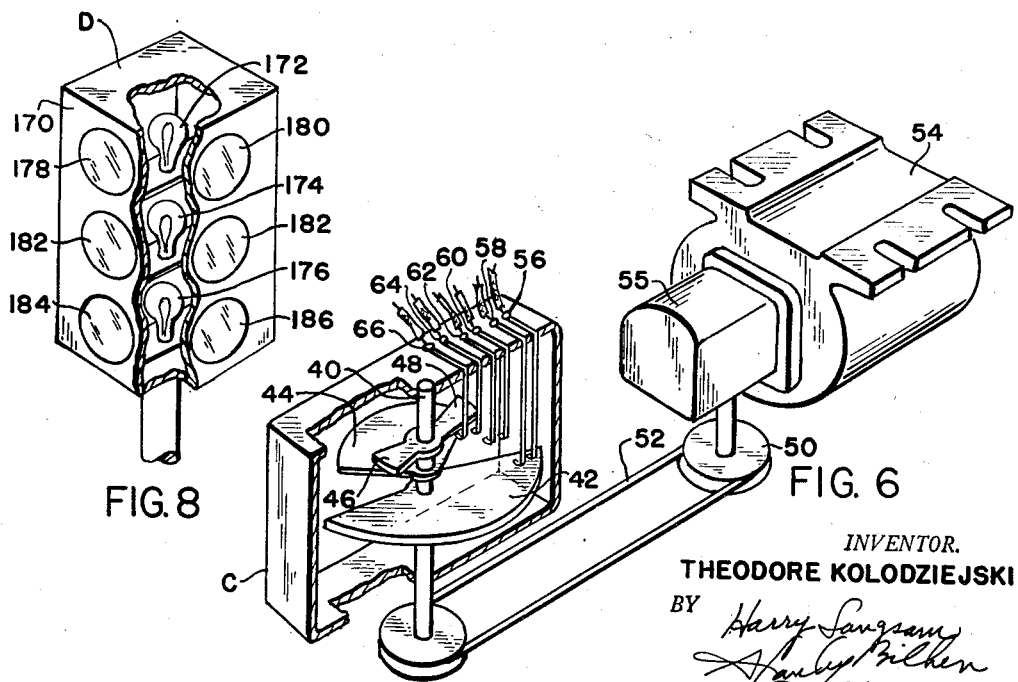
INVENTOR.
THEODORE KOLODZIEJSKI
ATTORNEYS

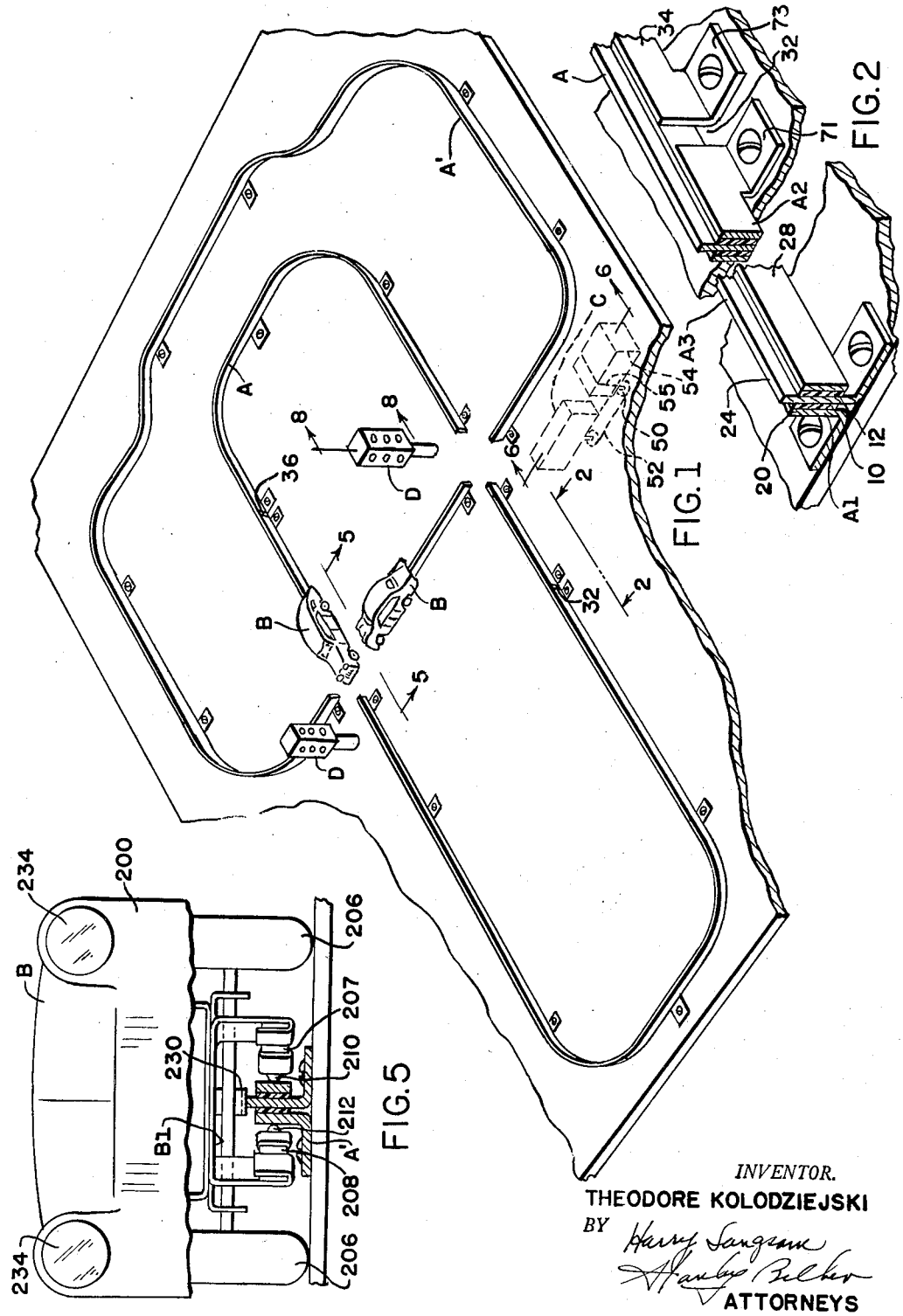

INVENTOR.
THEODORE KOLODZIEJSKI

United States Patent Office 2,920,420
Patented Jan. 12, 1960

2,920,420

TOY AUTOMOBILE AND TRACK

Theodore J. Kolodziejski, Philadelphia, Pa.

Application August 28, 1957, Serial No. 680,711

2 Claims. (Cl. 46—243)

My invention relates to an automobile track, and more particularly to an electrically powered automobile track upon which a toy automobile is automatically driven.

Heretofore, toy electrified tracks have been utilized for guiding and automatically powering a toy vehicle thereabout wherein a pair of individual spaced rails were employed upon which the vehicle wheels were guided and powered. As a result, it was difficult for a child to set the tracks up in a position such that any track contour could be employed since the track contour was governed by the fixed geometric configuration of the individual track elements. Furthermore, since the vehicle's wheels were usually guided by the track rails, complicated and expensive switching arrangements were required at intersections to preclude two vehicles from colliding at the intersection. Moreover, since the rails were spaced from each other by the distance between the vehicle's wheels, this required a greater area upon any setup and with the exception of railroad systems wherein it is desired to simulate full scale models, the preferable arrangement is to minimize the space required for the track.

It, therefore, is an object of my invention to provide a toy electrically operated track for guiding and powering an automobile wherein the track occupies a minimum of spaced width.

Another object of my invention is to provide a toy electrified track for an automobile wherein the track is flexible and can be mounted in any desired configuration.

Another object of my invention is to provide a toy electrified track wherein a plurality of track elements can be arranged in intersecting relationship with a simplified switching arrangement to prevent vehicles from colliding at any intersection thereof.

Another object of my invention is to provide an electrified automobile and track wherein an automatically operated traffic light system may be incorporated to simulate traffic control by operation of suitable stop and go signal lights.

Another object of my invention is to provide an electrified toy automobile and track wherein the automobile is positively secured upon the track and powered therefrom without the automobile deviating from the desired path.

Another object of my invention is to provide an electrified toy automobile and track wherein the track is integrated as a monorail and the automobile having steering means to enable variation in path in accordance with any desired configuration of the track.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings, in which:

Fig. 1 is a top perspective view of a toy automobile and track embodying my invention.

Fig. 2 is a fragmentary perspective view of the track rail construction.

Fig. 3 is a bottom perspective view of the automobile.

Fig. 5 is a sectional view taken along lines 5—5 of Fig. 1.

Fig. 6 is a perspective view, and partly broken away, showing the rotary switch.

Fig. 7 is a schematic view of the automobile electrical system.

Fig. 8 is a fragmentary perspective view of a traffic signal used with my invention taken along lines 8—8 of Fig. 1.

Figure 4:
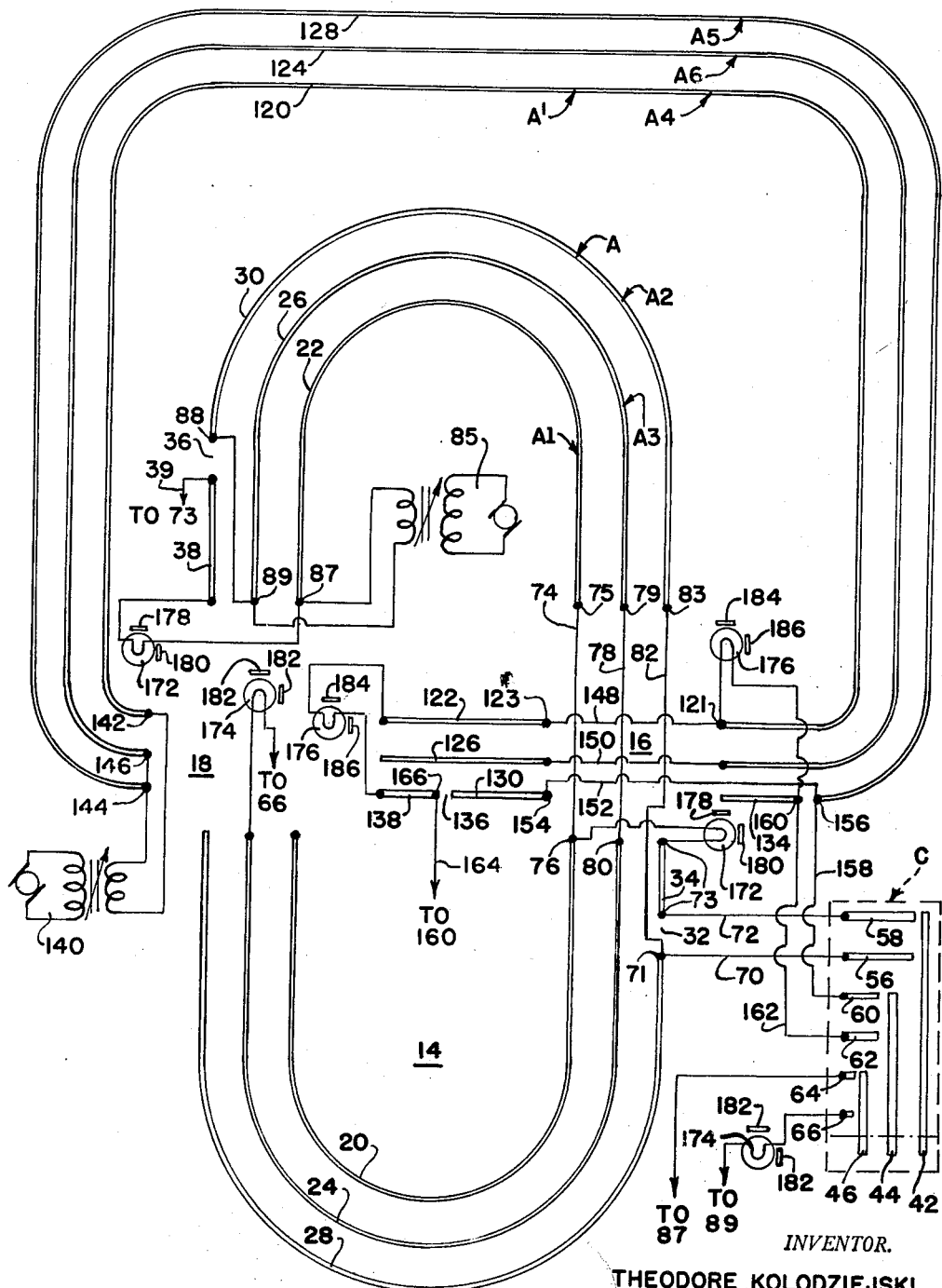
Fig. 4 is a schematic view of the track and switching system.

Referring now in greater detail to the drawings in which similar reference characters refer to similar parts, I show an automobile track, generally designated as A, upon which a toy automobile, generally designated as B, is electrically powered and guided. The track A is a single, integrated flexible rail comprising an inner strip A1, an outer strip A2 and a central strip A3 intermediate therebetween, the strip A1 being electrically insulated from strip A3 by a continuous layer of insulating material 10 and the strip A2 being electrically insulated from A3 by a continuous layer of insulating material 12. Each of the conducing strips A1, A2 and A3 are made from thin sheets of good electrically conducting material such as copper, and, together with the insulating layers 10 and 12, define a single thin rail which is quite flexible and may be adjusted into any arcuate configuration by mounting upon a suitable board 14.

As shown in Figs. 1 and 4, the track A is oriented into a generally elliptical configuration and split along the minor axis of the ellipse to define intersections 16 and 18 between longitudinally extending arcuate rails. The longitudinal spacing between the rails at the intersections is slightly less than the length of an automobile B but slightly greater than the width thereof. The rail strip A1 is thereby comprised of arcuate segments 20 and 22 and the center rail strip A3 is made up of arcuate segments 24 and 26 respectively. The outer rail strip A2 is divided into segments 28 and 30. The segment 28 has a minute insulated break at 32 whereby a short switching segment 34 adjacent the intersection 16 is insulated from the segment 28. Similarly the segment 30 has a short insulated break at 36 to define another switching segment 38 spaced therefrom and adjacent to the intersection 18. It is to be observed that the switching segments 34 and 38 are each approximately twice the length of the automobile B.

A rotary switch, generally designated as C, controls the electrical power to the switching segments 34 and 38 (see Fig. 4). The switch C comprises a shaft 40 having axially spaced blades 42, 44 and 46, 48 secured thereon. The blades 42 and 44 are each approximately 120° of arc and are secured to the shaft at diametrically opposite positions thereon. The blades 46 and 48 are each approximately 60° of arc and occupy diametrically opposite positions upon the shaft 40 intermediate the blades 42 and 44. It is to be noted that the blade 42 is slightly greater radially than the blade 44 and the blades 46 and 48 are equal to each other and have the shortest radius. The shaft 40 is rotatably supported and driven continuously by a pulley 50 and belt drive 52 from a motor 54 and gear reducer 55. The motor 54 is any conventional electrically powered motor which may be operated from a standard 110 volt line.

The blade 42 is adapted to close a set of contacts 56 and 58 each of which are of the brush type which project in a line parallel to the shaft 40 and are radially spaced therefrom at a position corresponding to the arcuate path of travel of the outer edge of the blade 42.

A second set of contacts 60 and 62 are adapted to be closed by the blade 44, these contacts 60 and 62 being parallel to the shaft and on the same line as the contacts 56 and 58 but on a shorter radius thereof. These contacts 60 and 62 are shorter in length than the contacts 56 and 58 and are thereby not engaged by the blade 42 because of their axial spacing therefrom nor by the blades 46 and 48 because of the shorter radial arc of the latter blades.

A third set of contacts 64 and 66 are adapted to be closed only by the blades 46 and 48. Since the contacts 64 and 66 are the shortest and are on the same line as contacts 56, 58, 60 and 62, but of the shortest radial spacing from the shaft 40, they cannot be engaged by either of the blades 42 or 44 at any rotary position thereof. The relative positioning of the switch blades and the control contacts are best seen from Fig. 6.

A lead wire 70 interconnects a terminal 71 on the outer rail segment 28 to the contact 56. A lead wire 72 interconnects a terminal 73 on the switching segment 34 to the contact 58, the contact 58 being closed with respect to the contact 56 only when the blade 42 is in engagement therewith. A jumper 74 interconnects the inner segments 20 and 22 by attachment to terminals 75 and 76 respectively. A similar jumper 78 interconnects the central rail segments 24 and 26 by joining terminals 79 and 80 respectively. A jumper 82 interconnects the segment 28 with the segment 30 by connection at 71 and 83 respectively. A source of electric power is introduced to the track A by a variable transformer 85 whose primary is connected to a suitable 110 volt power source and one terminal of the secondary being coupled to the inner rail 22 at 87. The second terminal of the transformer secondary is coupled to the outer rail segment 30 and the central rail segment 26 at terminals 88 and 89 respectively.

A second track, designated as A' (see Fig. 4), is mounted in intersecting relationship with the track A and is identical to the latter in every detail and comprises an inner rail strip A4, an outer rail strip A5 and a central rail strip A6 intermediate therebetween, the strips being again electrically insulated from each other. The track A' is also oriented into a generally elliptical configuration, the track A' being split at the intersections 16 and 18, again the longitudinal spacing between the split rails of track A' adjacent the intersections being slightly less than the length of the automobile B but slightly greater than the width thereof. The rail strip A4 is comprised of segments 120 and 122, the center rail strip of segments 124 and 126 respectively. The outer rail strip A6 is divided into segments 128 and 130 each having an insulated break at 132 and 136 to define switching segments 134 and 138 respectively which are spaced from the main segments adjacent to the intersections 16 and 18.

A second source of electrical power is introduced to the track A' by a variable transformer 140 whose primary is connected to a suitable 110 volt power source. One secondary terminal of the transformer 140 is coupled to the segment 120 at terminal 142. A second terminal of the transformer 142 secondary is coupled to the outer rail segment 128 and the central rail segment 124 at terminals 144 and 146 respectively. A jumper 148 couples the inner segments 120 and 122 through terminals 121 and 123 respectively. A second jumper 150 couples the central rail segments 124 and 126 each within the intersection 16. A jumper 152 couples the segment 130 to the segment 128 by connections at terminals 154 and 156 respectively. A lead wire 158 interconnects the terminal 156 on segment 128 to the switch contact 60 and switch contact 62 is coupled to segment 134 at terminal 160 through a lead wire 162.

It is to be observed that the terminals on each of the track segments are formed as feet bent substantially at right angles to the conductive strips whereby the track itself may be conveniently mounted in an upright position upon a board or table, and the terminal connections may be made by soldering or by screws.

The switching segment 138 is coupled to the switching segment 134 by a lead wire 164 from terminals 166 to 160, and segment 38 is similarly coupled to segment 34 by a lead wire 39 extending therefrom to terminals 73.

Traffic lights, generally designated as D, are mounted at each of the intersections 16 and 18 and comprise a housing having three vertically spaced lamps 172, 174 and 176 mounted therein. The housing 170 is square in cross section and has transparent colored windows on each side thereof adjacent the lamps 172, 174 and 176 respectively. Green windows 178 are mounted on opposite sides of the housing 170 adjacent the lamp 172 whereas red windows 180 are mounted on opposite sides of the housing 90° displaced from the windows 178. Amber windows 182 are mounted upon the four sides of the housing 170 adjacent the lamp 174. The lowermost windows 184 below the green windows 178 are secured adjacent the lamp 176 and are accordingly colored red. Green windows 186 are disposed adjacent the lamp 176 90° displaced from the red windows 184 and mounted upon the housing 170 below the red windows 180.

The green windows 178 and the red windows 184 face the longitudinal path of the track A whereas the red windows 180 and the green windows 186 face the longitudinal path of the track A'. The lamp 172 is mounted across the switching segments 34—38 and inner rail segments 20—22 between terminals 73 and 76, and the lamp 176 is mounted across the switching segments 134—138 and inner rail segments 120—122 between terminals 121 and 160. The lamp terminals of the traffic light D mounted within the intersection 18 are identically disposed, the terminals of each of the lamps being coupled to the same terminals as those mounted within the intersection 16 or comparable terminals within the intersection 18. The lamp 174 is mounted across the switch contact 66 and the central rail segments 24—26 at terminal 89, the switch contact 64 being coupled to the inner rail segments 20—22 at terminal 87. It is to be observed that the terminals to which the lead wires are joined are merely for purpose of illustration and comparable terminals on similar segments for producing the same result may be utilized.

In Fig. 3 I show a bottom perspective view of the automobile B. The automobile B comprises an external frame or shell 200 which resembles, in miniature, a conventional automobile construction. Within the frame 200 is mounted an electrically powered motor 202 which is geared to and drives a pair of rear wheels 204 rotatably supported in the frame. The front portion of the frame 200 at the bottom of the automobile B is pivotally mounted on a carriage B1, front wheels 206 being rotatably supported within this carriage. The forward portion of the carriage has a pair of insulated elements 207 and 208 arranged in a V-shaped configuration, the rearward portion of the elements being urged resiliently toward one another. Ball type contact elements 210 and 212 are secured respectively to the insulated members 207 and 208, these contacts being adapted to wipe against the inner end outer rail segments, respectively, of the track. A similar carriage B2 is pivotally supported at the rear of the automobile frame 200 immediately behind the rear wheels 204. The rear carriage B2 comprises a pair of insulated members 220 and 222 which are arranged in V-shaped configuration resiliently urged toward one another at the rearward portion thereof. Ball type contact elements 224 and 226 are respectively secured to the insulated members 220 and 222 and are also adapted to wipe against the inner and outer rail segments respectively. The pivotal arrangement of the forward carriage enables the automobile to make contact electrically with the rail segments regardless of the configuration or orientation of the track. The forward carriage B1 is spaced from the rear carriage B2 in order to enable electrical contact of the automobile to be continuous as the automobile crosses the intersections. The contacts 210 and 224 are wired to one side of the motor 202 and respectively the contacts 212 and 226 are wired to the other side of the motor. Centrally disposed brush type contacts 230 and 232 are respectively mounted at the front and rear portions of the under portions of the automobile and each is adapted to engage the central rail segments. (See Fig. 5.) The contacts 230 and 232 are wired together and are coupled to one side each of front lamps 234 and tail lamps 236. The other terminal of each of the lamps 234 and 236 are wired to the contacts which engage the inner rail segments (see Fig. 7).

As is easily apparent from the foregoing description, my invention operates as follows:

An automobile B is placed upon the track A, as shown in Fig. 4, whereby when power is supplied to the track the automobile will operate in a counterclockwise direction. A second automobile is placed upon track A' and is so powered to operate in a clockwise direction. Each of the automobiles will operate continuously about the track and one will stop upon the section immediately prior to the intersection when the circuit thereto is open as governed by the rotary switch. The other automobile, should it arrive at the intersection simultaneously, will cross thereover since the circuit to its switching segment will be closed as a result of the position of the switch C. The spacing between the U-type carriages B1 and B2 enables the automobile to cross the intersection since power will be directed to the motor 202. Therefore the automobiles will continuously be driven about their respective tracks and be controlled from colliding at the intersections should they arrive thereat simultaneously, one automobile stopping and the other proceeding through the intersection. The traffic signal D will continuously operate as seen from the circuit diagram and provide a simulated traffic system wherein a red light will occur in that direction from which an automobile is designated to stop. Similarly when a green light is indicated, the automobile may proceed through the intersection. While the speed of each of the automobiles may be independently controlled through the adjustment of each of the transformers 85 and 140 respectively, the switch C will always control the stopping or proceeding of an automobile through the intersection to prevent collision thereof.

Although my invention has been described in considerable detail, such description is intended as being illustrative rather than limiting, since the invention may be variously embodied, and the scope of the invention is to be determined as claimed.

I claim as my invention:

1. An automobile track comprising a pair of flexible rails arranged in a substantially double loop configuration, the ends of said rails being longitudinally spaced from each other to define a pair of intersections of said double loop, each of said rails comprising a pair of thin electrically conductive flat metal strips, the strips of each rail respectively being secured to each other by a thin layer of electrical insulation to define a flexible monorail, one of the strips of each of said rails being split adjacent the intersection to define a segment insulated from the longitudinally adjacent strip, a voltage input adapted to be applied across adjacent strips, a rotary switch means adapted to alternately open and close an electrical circuit between each of said segments and each of said longitudinally extending adjacent strips whereby an automobile having a motor with contacts wiping said strips will be driven longitudinally in said loop path and stop adjacent the segment at the intersection adjacent loop thereto when the circuit to said segment is open, a traffic signal being synchronized with said rotary switch means, said rotary switch means comprising a plurality of blades axially spaced upon a motor driven shaft and a pair of brush type contacts respectively adapted to be closed by each of said blades, two of said blades occupying 120° of arc and each being positioned respectively at diametrically opposite positions on said shaft, and a third blade having diametrically opposite portions, and each portion occupying 60° of arc and being spaced intermediate the arcuate position of said first and said second mentioned blades respectively.

2. An automobile track comprising a pair of flexible rails arranged in a substantially double loop configuration, the ends of said rails being longitudinally spaced from each other to define a pair of intersections of said double loop, each of said rails comprising a pair of thin electrically conductive flat metal strips, the strips of each rail respectively being secured to each other by a thin layer of electrical insulation to define a flexible monorail, one of the strips of each of said rails being split adjacent the intersection to define a segment insulated from the longitudinally adjacent strip, a voltage input adapted to be applied across adjacent strips, a rotary switch means adapted to alternately open and close an electrical circuit between each of said segments and each of said longitudinally extending adjacent strips whereby an automobile having a motor with contacts wiping said strips will be driven longitudinally in said loop path and stop adjacent the segment at the intersection adjacent loop thereto when the circuit to said segment is open, a traffic signal being synchronized with said rotary switch means, said rotary switch means comprising a plurality of blades axially spaced upon a motor driven shaft and a pair of brush type contacts respectively adapted to be closed by each of said blades, two of said blades occupying 120° of arc and each being positioned respectively at diametrically opposite positions on said shaft, and a third blade having diametrically opposite portions, and each portion occupying 60° of arc and being spaced intermediate the arcuate position of said first and said second mentioned blades respectively, wherein a central rail strip is spaced intermediate said pairs of insulated strips and insulated therefrom, said central rail strip being higher in cross section than said first mentioned strips and wherein an automobile having a brush type contact downwardly extending therefrom in wiping engagement with said central rail strip may have head and tail lights energized.

References Cited in the file of this patent

UNITED STATES PATENTS

| | | |
|---|---|---|
| 2,171,634 | Rexford | Sept. 5, 1939 |
| 2,256,862 | Duffy | Sept. 23, 1941 |
| 2,450,867 | Smith | Oct. 5, 1948 |
| 2,836,129 | Jaeger | May 27, 1958 |

FOREIGN PATENTS

| | | |
|---|---|---|
| 451,397 | Great Britain | Aug. 5, 1936 |
| 1,118,948 | France | Mar. 26, 1956 |